United States Patent [19]

Jensen

[11] Patent Number: 5,595,015

[45] Date of Patent: Jan. 21, 1997

[54] FISHING LURE

[75] Inventor: Roger P. Jensen, Hood River, Oreg.

[73] Assignee: Miracle Tackle Co., Inc., Stevenson, Wash.

[21] Appl. No.: 249,747

[22] Filed: May 26, 1994

[51] Int. Cl.⁶ ..................................... A01K 85/00
[52] U.S. Cl. .................. 43/42.06; 43/42.08; 43/42.2; 43/42.19
[58] Field of Search .............. 43/42.06, 42.15, 43/42.08, 42.16, 42.17, 42.2, 42.19, 42.18

[56] References Cited

U.S. PATENT DOCUMENTS

| | | | |
|---|---|---|---|
| 1,033,281 | 7/1912 | Skvor et al. | 43/42.08 |
| 1,222,774 | 4/1917 | Cleonard. | |
| 2,940,204 | 6/1960 | Mehnert | 43/42.19 |
| 2,960,789 | 11/1960 | Paynter | 43/42.2 |
| 3,417,503 | 12/1968 | Meulnart | 43/42.08 |
| 3,698,119 | 10/1972 | Levoin | 43/42.08 |
| 3,987,576 | 10/1976 | Strader. | |
| 4,133,134 | 1/1979 | Cheng. | |
| 4,163,338 | 8/1979 | Locarini. | |
| 4,208,824 | 6/1980 | Maxwell. | |
| 4,447,981 | 5/1984 | Bauer | 43/42.21 |
| 4,703,579 | 11/1987 | Kay. | |
| 4,730,410 | 3/1988 | Sobieniak. | |
| 4,736,542 | 4/1988 | Floyd. | |
| 4,744,167 | 5/1988 | Steele. | |
| 4,884,359 | 12/1989 | Wray. | |
| 4,930,245 | 6/1990 | Bazzano | 43/42.06 |
| 5,113,606 | 5/1992 | Rinker. | |

OTHER PUBLICATIONS

Photocopy of antique lure, est. 1940's by Siberian Pato.

*Primary Examiner*—Chuck Y. Mah
*Attorney, Agent, or Firm*—Robert L. Harrington

[57] ABSTRACT

A fishing lure having visual and aromatic attraction to fish. A spindle carries a rotatable spinner and a cone shaped housing that is slidable on the spindle between an upper and lower position. A cavity is formed in the bottom end of the housing and the spindle extends axially down through the housing and into and through the cavity and out the cavity mouth. A restriction on the spindle determines the lower position of the housing on the spindle. A bead on the spindle is positioned in the cavity mouth with the housing in the lower position. The cavity can be filled with scented bait when the housing is slid upwardly on the spindle to move the bead out of the cavity mouth. With the housing in the lower position the bead retains the bait in the cavity.

3 Claims, 2 Drawing Sheets

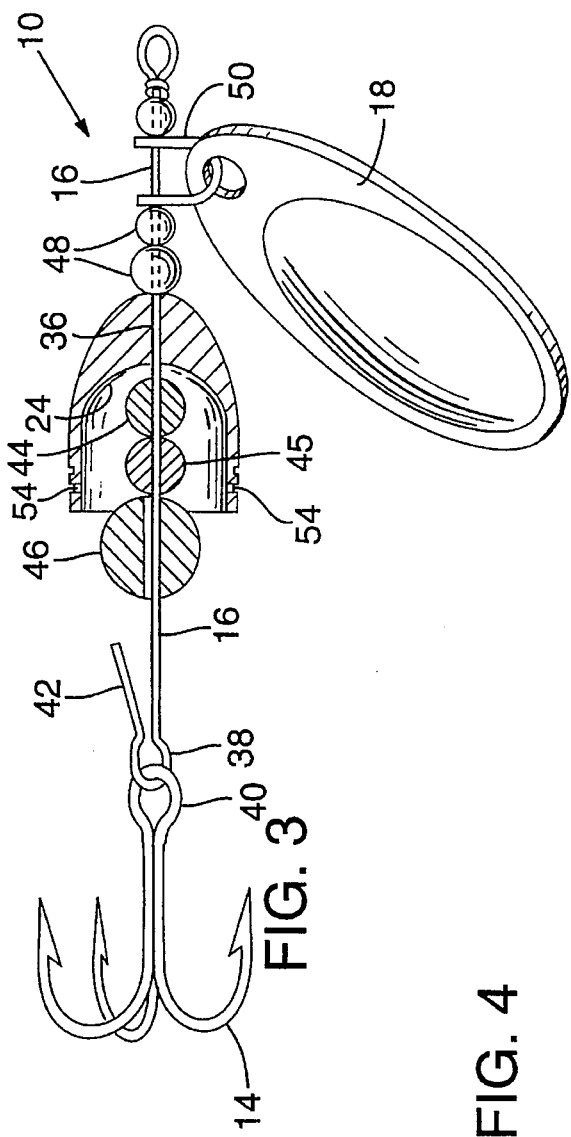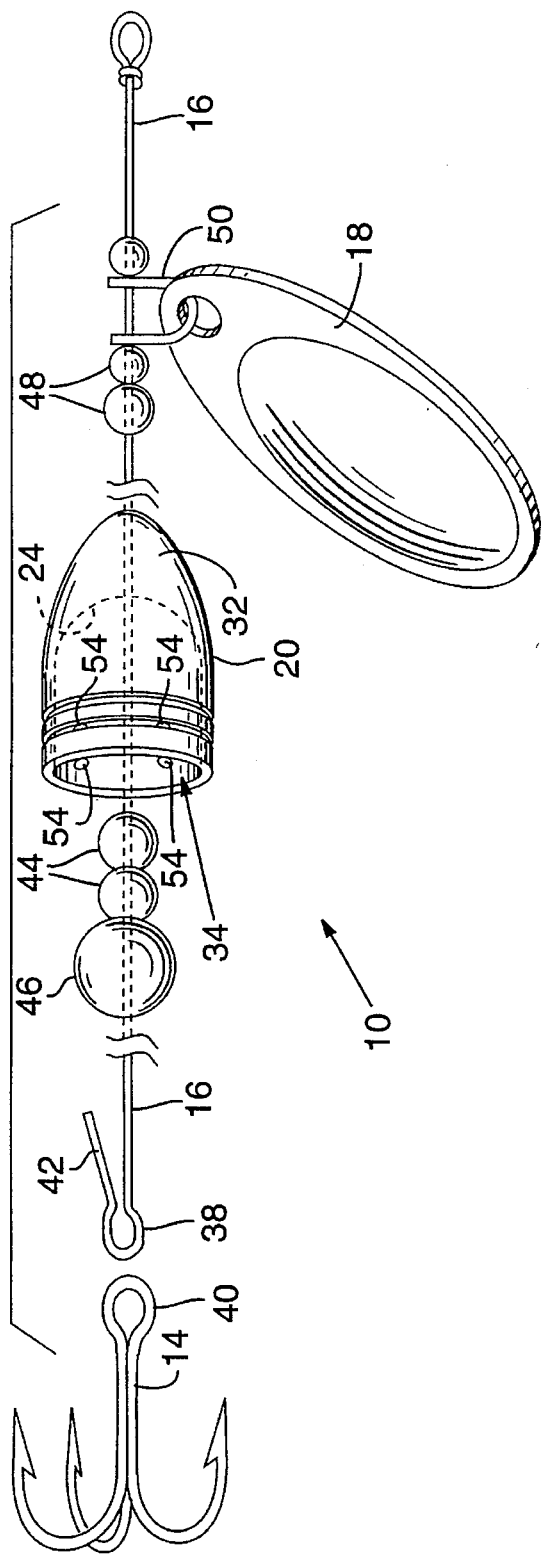

FISHING LURE

FIELD OF THE INVENTION

This invention relates to artificial fishing lures and more particularly to a fishing lure having an accessible scent chamber for fish-attracting scented bait.

BACKGROUND OF THE INVENTION

Fishing lures of the present invention are intended to be drawn through the water (as in casting or trolling) and in the process to simulate a food source for fish, e.g., another fish which may be smaller or wounded. The objective is to make the lure resemble the wounded or smaller fish in sight, sound, or smell. The fishing lures as particularly contemplated herein are often referred to as spinners.

An example of a fishing lure which is intended to represent sight and sound (but not smell) is U.S. Pat. No. 4,163,338. A spoon rotatably mounted on a wire spindle spins around the spindle due to the action of the lure moving through the water. The spinning spoon visually stands out in the water and attracts fish. A housing containing a separate weight is mounted on the same wire spindle. Spinning of the spoon causes the weight to contact the inside wall of the housing to create sound that also attracts the fish.

More recently a new product that has entered the fish lure market is scented bait. Whereas there are different forms of scented bait, the form contemplated herein is a bait material having the consistency of American type cheese. Typically the scented bait is rubbed onto a lure attached to the end of the fishing line and the fish are attracted by the scent. The problem with this manner of applying scented bait onto fishing lures that are dragged through the water is that the bait material is quickly washed off of the lure.

BRIEF DESCRIPTION OF THE INVENTION

It is an object of the present invention to provide a fishing lure of the type that visually attracts fish but also is adapted for retaining the scented bait for an extended time. In the preferred embodiment, the lure includes a wire spindle with a spoon that spins around the spindle and provides the visual attraction. A housing is slidably mounted on the spindle below the spoon and includes a bottom cavity. The spindle continues into and through the cavity and a fish hook is attached to the bottom end of the spindle. The fish line is attached to the top end of the spindle. A plurality of spaced apart beads are provided on the spindle between the housing and the hook. A top bead abuts the top side of the cavity inside the housing and limits travel of the housing toward the hook. A bottom bead is positioned at the mouth of the cavity. The scented bait is placed in the cavity and the bottom bead confines the bait and prevents it from falling out of the cavity. The bait is nevertheless in contact with the surrounding water and the bait material is released into the water with the bait gradually washed out of the cavity referred to herein as attrition. Alternatively holes may be provided in the wall of the housing and into the cavity to allow restricted water flow through the cavity and increased attrition of the bait material into the surrounding water. The spinning spoon agitates the water flowing into the housing which is also believed to enhance attrition of the scented bait.

BRIEF DESCRIPTION OF THE DRAWINGS

For a better understanding of the invention, and to show how the same may be carried into effect, reference will now be made, by way of example, to the accompanying drawings in which:

FIG. 3 is a sectional view illustrating the manner of attaching the fishing hook; and FIG. 4 is an exploded perspective view of the fishing lure of FIGS. 1, 2 and 3.

DETAILED DESCRIPTION OF THE PREFERRED EMBODIMENT

Figure 1:
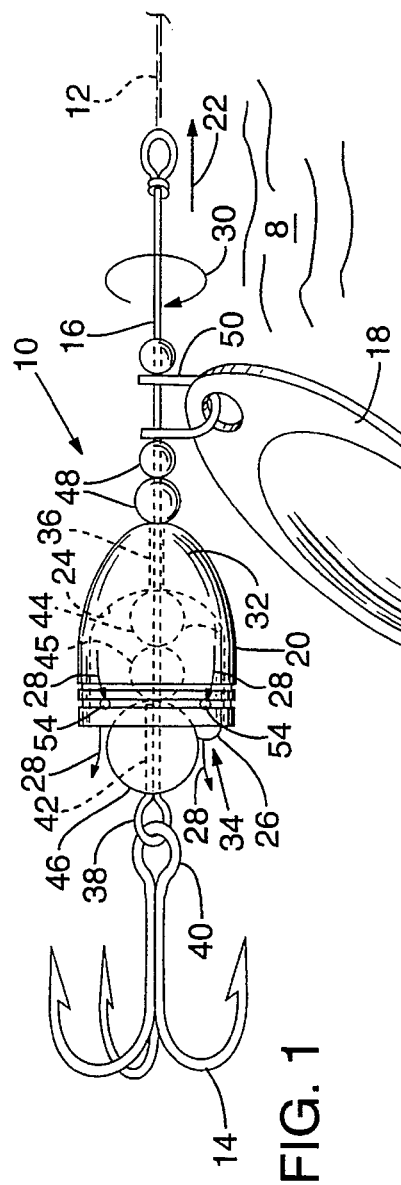
FIG. 1 illustrates a fishing lure of the present invention being pulled through a body of water.

FIG. 1 illustrates a fishing lure 10 of the present invention, attached to a fish line 12 at the upper end and a fish hook 14 at the lower end. The fishing lure 10 includes a wire spindle 16, a spoon 18 attached to the upper end of the spindle and a housing 20 attached to the spindle below the spoon 18. The assembly of fishing lure 10 and hook 14 is pulled through a body of water 8 as indicated by arrow 22, e.g., as when trolling or casting. As will be explained in detail hereafter, a cavity 24 (shown in dash lines in FIG. 1) contains a quantity of scented bait 26 (also shown in dash lines) and as the fish lure 10 is drawn through the water, the bait 26 is gradually absorbed into the water that flows into and through the cavity 24 as indicated by arrows 28. At the same time, the spoon 18 rotates or spins around the spindle 16 as indicated by arrow 30. This spinning of the spoon agitates the water into which the housing 20 is drawn and effects the attrition of the bait into the water.

Figure 2:
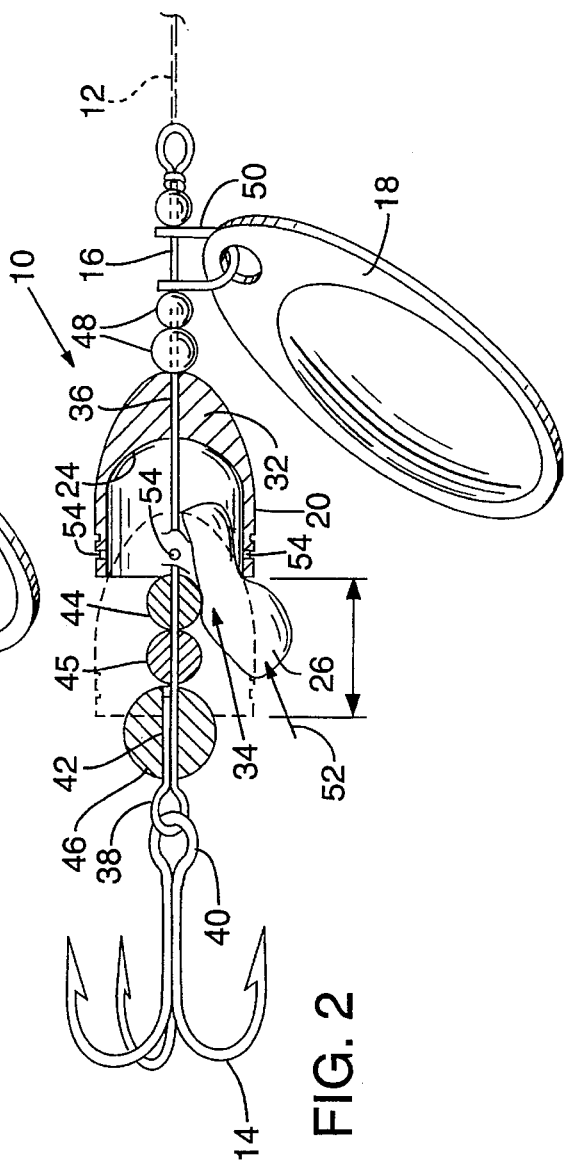
FIG. 2 is a partially sectioned view of the fishing lure of FIG. 1 being filled with scented bait.

Reference is now made to FIGS. 2 and 4. Housing 20 is configured to have a solid upper portion 32 to provide the housing with the desired weight. The housing 20 is essentially bell or cone shaped with the cavity 24 defining an open end 34. As illustrated in FIG. 2, the spindle 16 extends through an orifice 36 in the housing along the axial center of the housing 20, into the cavity 24 and out the opening 34. The spindle terminates in a U-shaped end portion 38. The hook 14 has an upper end that forms a loop 40. As best seen in FIG. 3, with the extreme end 42 of end portion 38 exposed, the loop 40 of the hook 14 is placed over end 42 and drawn down the end portion 38 to nest in the crutch of the U as illustrated. Located on the spindle wire 16 between the housing 20 and hook 14 are beads 44, 45 and 46.

As will be seen in FIG. 2, the housing 20 is slidable on the spindle 16 between the bushing 48 (two small rotatable beads which facilitate rotation of the stirrup 50 used to mount the spoon 18 to the spindle) and the upper bead 44. Gravity and drag of the water urges the housing to its lower position as shown in dash lines in FIG. 2. As will be noted from the dash line position of the housing in FIG. 2, the lower position of the housing 20 is dictated by the nesting of bead 44 in the apex of the cavity 24 with bead 46 substantially fixed in place at the spindle's lower end and with bead 45 providing a spacer between beads 44 and 46. In this position the lower bead 46 is positioned at the mouth or open end 34 of the cavity. (See also FIG. 1.)

As shown in solid lines in FIG. 2, the housing 20 can be slid up the spindle thus opening the mouth or end 34 of the cavity 24. (Note that the upper bead 44 and spacer bead 45 are smaller than bead 46.) A portion of scented bait 26 can be inserted into the cavity around beads 44, 45 as illustrated in FIG. 2 (the insertion process indicated by arrow 52).

In operation, the fishing lure is drawn or dragged through the water as illustrated in FIG. 1 and water flows over the scented bait 26 as permitted by the spacing around the bead 46. The water wears away at the bait 26 to gradually release the material of the scented bait into the surrounding water to create the desired scent for attracting fish. Alternatively, openings 54 may be provided through the wall of the housing to enhance the flow of water (arrows 28 in FIG. 1) into and through the cavity 24 so as to accelerate the process of releasing the bait 26 to the surrounding water.

With reference to FIG. 3, it will be appreciated that the hook 14 can be changed simply by (a) sliding the housing 20 up to expose bead 46, (b) sliding the bead 46 off the end 42 of the U-shaped end portion 38 of spindle 16, (c) sliding the loop 40 of hook 14 off the end 42, (d) placing a new hook 14 onto the U-shaped end portion 38, (e) pinching the end 42 against the body portion of spindle 16, and (f) sliding the bead 46 back over the end 42.

Numerous variations will become apparent to those skilled in the art upon review and understanding of the above disclosure without departing from the invention as defined in the claims appended herein. For example, it is believed that one could readily design a spinner of the present invention with the housing fixed to the spindle and the restriction or retainer, e.g., the bead 46, retractable away from the mouth of the cavity.

What is claimed is:

1. An artificial fishing lure comprising;

a spindle having opposed top and bottom ends adapted for attachment to a fishing line at the top end and a fishing hook at the bottom end;

a bell shaped housing having an upper end and a lower end and provided with a cavity that opens to the lower end and forming a cavity mouth, and an orifice provided in the housing extending from the upper end down into the cavity, said housing slidably mounted on said spindle which extends down through the orifice and into the cavity and out through the cavity mouth;

a first restriction provided on said spindle within said cavity to restrict downward movement of the housing on the spindle, and a second restriction provided on said spindle and positioned at said cavity mouth with the first restriction engaging the housing and restricting further downward movement, said second restriction sized to provide limited spacing at the cavity mouth for limiting water flow through said cavity; and scented bait having a consistency that allows shaping of the bait to enable insertion into the cavity with the housing retracted upwardly relative to said second restriction to thereby open the cavity mouth, and said scented bait retained in said housing with the housing slid to its lower position whereat the second restriction is positioned in the cavity mouth.

2. An artificial fishing lure as defined in claim 1 wherein said second restriction is a bead.

3. An artificial fishing lure comprising;

a spindle having opposed top and bottom ends adapted for attachment to a fishing line at the top end and a fishing hook at the bottom end;

a bell shaped housing having an upper end and a lower end and provided with a cavity that opens to the bottom end and forming a cavity mouth, and an orifice provided in the housing from the top down into the cavity, said housing slidably mounted on said spindle which extends down through the orifice and into the cavity and out through the cavity mouth;

a first restriction provided on said spindle within said cavity to restrict downward movement of the housing on the spindle, and a second restriction provided on said spindle and positioned at said cavity mouth with the first restriction engaging the housing and restricting further downward movement;

said bottom end of the spindle being U-shaped with the extreme bottom end folded against the spindle, a hook having an upper loop threaded onto said spindle and located in the crutch of the U-shaped end portion, and said second restriction in the form of a bead slidable on said spindle between a first position where the extreme end of the spindle is located inside the bead and a second position where the extreme end of the spindle is exposed to permit removal and replacement of the hook.

\* \* \* \* \*